(12) United States Patent
Tsun et al.

(10) Patent No.: US 7,657,611 B2
(45) Date of Patent: Feb. 2, 2010

(54) CONTENT REQUEST OPTIMIZATION

(75) Inventors: Stephen Tsun, Cupertino, CA (US);
Deepak Jindal, Cupertino, CA (US)

(73) Assignee: Google Inc., Mountain View, CA (US)

( * ) Notice: Subject to any disclaimer, the term of this patent is extended or adjusted under 35 U.S.C. 154(b) by 448 days.

(21) Appl. No.: 11/554,348

(22) Filed: Oct. 30, 2006

(65) Prior Publication Data

US 2008/0104194 A1 May 1, 2008

(51) Int. Cl.
*G06F 15/16* (2006.01)
*G07Q 30/00* (2006.01)
*G07G 1/14* (2006.01)

(52) U.S. Cl. .................. 709/219; 705/14; 709/217; 709/218; 715/234; 715/237; 715/240

(58) Field of Classification Search .......... 715/234, 715/237, 340; 709/217–219
See application file for complete search history.

(56) References Cited

U.S. PATENT DOCUMENTS

| 6,067,565 | A | 5/2000 | Horvitz | |
|---|---|---|---|---|
| 6,725,421 | B1 | 4/2004 | Boucher et al. | |
| 2002/0055966 | A1* | 5/2002 | Border et al. | 709/200 |
| 2002/0165955 | A1* | 11/2002 | Johnson et al. | 709/224 |
| 2004/0093327 | A1 | 5/2004 | Anderson et al. | |

FOREIGN PATENT DOCUMENTS

WO WO02/15531 A1 2/2002

OTHER PUBLICATIONS

Microsoft, "Microsoft Corporation" Microsoft.com, Oct. 28, 2005 (retrieved by archive.org).*
Sanders, "JavaScript Design," New Riders, Dec. 2001. (Relevant section included).*
U.S. Appl. No. 11/554,419, filed Oct. 30, 2006.
U.S. Appl. No. 11/554,423, filed Oct. 20, 2006.
Brattli, T. "Dynamic data using the DOM and Remote Scripting." dhtml central.com. Feb. 21, 2001 (4 pages).
"Nagle's algorithm." Wikipedia, the free encyclopedia [online], pp. 1-2 [retrieved on Jan. 7, 2009]. Retrieved from the Internet <http://en.wikipedia.org/wiki/Nagle's_algorithm>.
Nagle, J. "Congestion Control in IP/TCP Internetworks." Network Working Group [online]. Jan. 6, 1984, pp. 1-9. [retrieved on Jan. 7, 2009]. Retrieved from Internet <http://tools.ietf.org/rfc/rfc896.txt>.
Xie, X. et al. "Maximizing Information Throughout for Multimedia Browsing on Small Displays" In Multimedia and Expo, 2004, ICME '04. IEEE International Conference, vol. 27-30 Jun. 2004, pp. 2143-2146 vol. 3, [online], [retrieved Jan. 28, 2008]. Retrieved from the Internet: <http://research.microsoft.com/asia/dload_files/group/ims/26.pdf>.

(Continued)

*Primary Examiner*—Ashok B. Patel
*Assistant Examiner*—Joshua Collins
(74) *Attorney, Agent, or Firm*—Fish & Richardson, P.C.

(57) ABSTRACT

Content item requests are identified in a web page source document. For each request, it is determined if a content item request has been generated, and if a content item request has not been generated, a content item request for all requests in the web page source document is generated.

18 Claims, 6 Drawing Sheets

OTHER PUBLICATIONS

Becta Technical Papers "Web Caches" 2005 [online], [retrieved on Jan. 28, 2008]. Retrieved from the Internet <URL: http://foi.becta.org.uk/content_files/corporate/resources/technology_and_education_research/web_caches.pdf>.

Xing, X. et al., "Maximizing Information Throughout for Multimedia Browsing on Small Displays" In Multimedia and Expo, 2004, ICME '04. IEEE International Conference, vol. 27-30 Jun. 2004, pp. 2143-2146 vol. 3, [online], [retrieved Jan. 28, 2008]. Retrieved from the Internet: <http://research.microsoft.com/asia/dload_files/group/ims/26.pdf>.

Mohan, C., "Caching Technologies for Web Applications" Sep. 2001 [online], [retrieved on Jan. 28, 2008]. Retrieved from the Internet: <URL: http://www.almaden.ibm.com/u/mohan/Caching_VLDB2001.pdf>.

Fisher & Saksena et al., "Link Prefetching in Mozilla: A Server-Driven Approach*" Eighth International Workshop on Web Content Caching and Distribution. Sep. 29-Oct. 1, 2003, 6 pages XP002556392, [online] [retrieved on Nov. 2009] retrieved from the internet: <URL:http://2003.iwcw.org/papers/fisher.pdf>.

Padmanabhan, V.N., "Improving World Wide Web Latency*" University of California Report, May 1, 1995, 24 pages, XP002041557.

European Examiner Stephane Michalski, Supplemental European Search for Application No. EP 07844736.4-2201, dated Dec. 10, 2009, 3 pages.

\* cited by examiner

CONTENT REQUEST OPTIMIZATION

FIELD

This disclosure relates to information retrieval.

BACKGROUND

Content displayed on a web page can be generated by one or more content item servers in response to content item requests that are generated during the rendering of the web page by a client device. Often a publisher of a web page may define multiple content item environments, e.g., advertisement slots, for content items, e.g., advertisements, to be displayed within a web page. Typically, each content item environment has an associated content item request e.g. an advertisement request, that is transmitted to a content item server, e.g., an advertisement server. When the web page is rendered by a client device that has requested the publishier's web page, a content item will be displayed in each content item environment.

A web page having multiple content item environments can, however, generate excessive traffic to the content item server. Additionally, because web page instructions are often interpreted, the content item requests are generated as each content item request instruction is processed. Accordingly, a first content item request for a web page is transmitted and served without knowledge of any subsequent content item requests that may be encountered for that page. Thus, each content item served by the content item server for a web page if the rendering of the web page generates multiple content item requests.

SUMMARY

Disclosed herein is a content request optimization system that includes first and second instructions stored in a data store. The first instructions are configured to define content item environments in a page environment. The second instructions are associated with each content item environment, and configured to determine whether a content item request has been generated by any of the second instructions, and in response to determining that a content item request has not been generated by any of the second instructions, generate a content item request for content items for each of the content item environments.

A method for content request optimization identifies requests in a web page source document. For each identified requests, a determination is made if a content item request has been generated. If a content item request has not been generated, then a content item request for all requests in the web page source document is generated.

Another example content request optimization system includes a data store storing a web page source files. The web page source files include declaration instructions configured to define advertisement slots and rendering instructions associated with the advertisement slots. The rendering instructions are configured to determined whether an advertisement request has been generated, and in response to determining that an advertisement request has not been generated, transmit an advertisement request for each of the advertisement slots.

Another example content request optimization system includes a data store storing a web page source files. The web page source files include declarations instructions, fetching instructions, and rendering instructions. The declaration instructions are configured to define content item environments, and the fetching instructions are configured to generate content item requests for each of the content item environments. The rendering instructions are associated with the advertisement slots and configured to generate local content item calls to retrieve content item received in response to the content item requests and render the retrieved content items in corresponding content item environments.

The systems and methods described herein may realize one or more of the following features and advantages. A single content item request for a plurality of content item environments can be generated, reducing content item server traffic. A content item server may optimize the selection of content items for a requesting web page, as the content items may be selected based on the content item request and other selected content items for the requesting web page. These and other advantages and features may be realized by the systems and methods described below.

DETAILED DESCRIPTION

Figure 1:
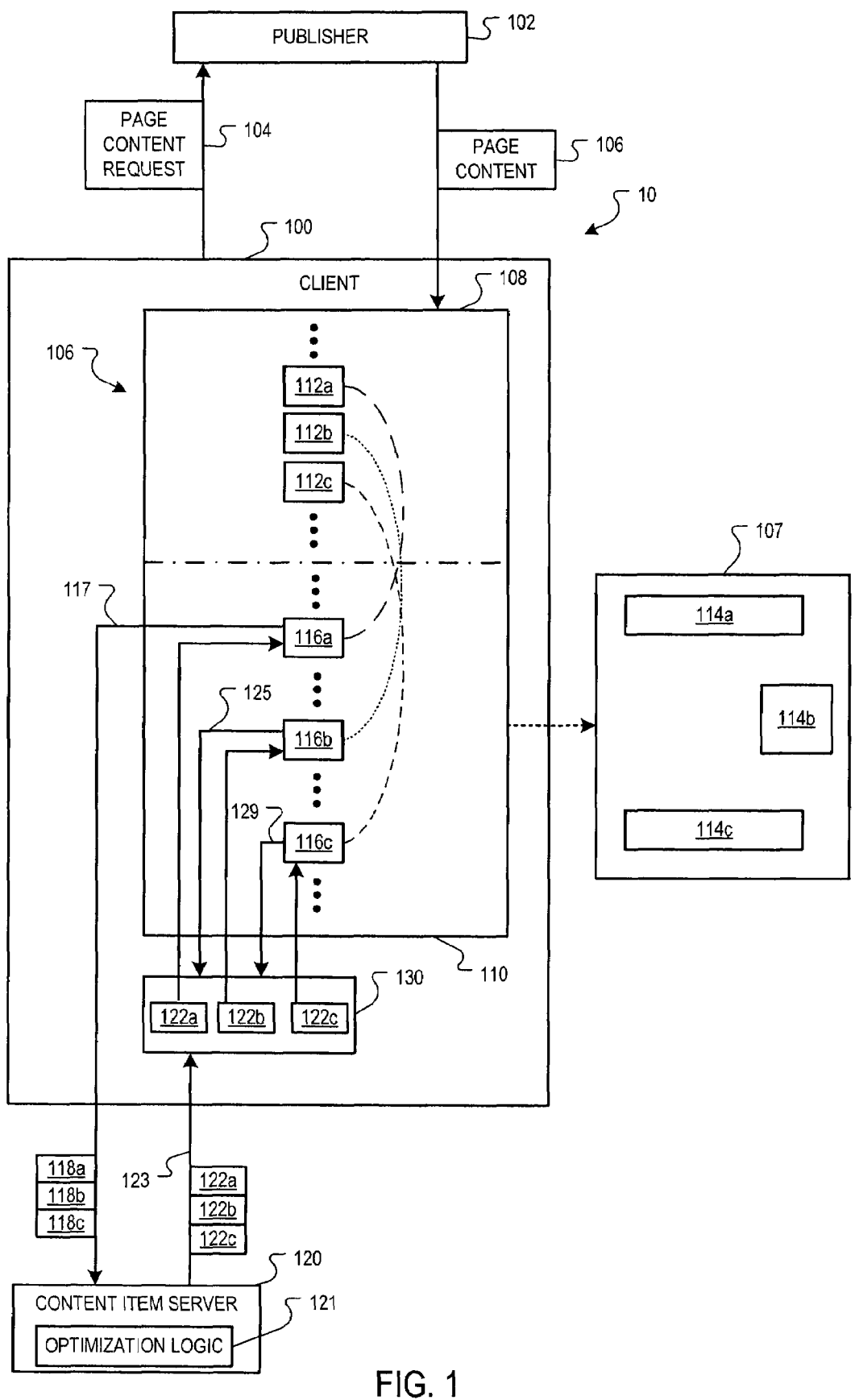
FIG. 1 is a block diagram of an example system for requesting content from a source.

FIG. 1 is a block diagram of an example system 10 for requesting content items from a source, e.g., a content item server. In on implementations, the content items can be advertisements, and the content item server can be an advertisement server. Different types of content can also be requested, e.g., weather, driving directions, trivia, etc.

The requesting device, in the implementations shown, is a client system 100 that is configured to visit web pages over a network, e.g., the Internet. The client system 100 can, for example, be a web browser, a computing device, a mobile communication device, or some other device executing network navigation software and the like. The web address visited by the client system 100 can be resolved to identify a publisher 102, e.g., a server, hosting a corresponding web page. The client system 100 thus sends a web page content request 104 to the publisher 102 for the web page content 106, e.g., a hypertext markup language (HTML) source document, and the publisher 102, in response to the request, provides the web page content 106 to the client system 100.

In an implementation, the web page content 106 can, for example, include a head section 108 and body section 110, each section having interpreted instructions. The head section 108 can, for example, be interpreted before the body section 110. In an implementation, first instructions 112a, 112b and 112c, e.g., declarations instructions, are executed in the head section 108 to define one or more content item environments 114a, 114b, and 114c to be rendered in a corresponding web page 107 to be displayed on a display device. For example, the content item environments 114a, 114b, and 114c can comprise advertisement slots that are rendered and displayed in the approximate positions as depicted in the rendered web page 107, e.g., in top slot, a middle slot, and bottom slot. In one implementation, the content item environments 114a, 114b, and 114c can be synchronous environments, e.g., divs within the same frame of the rendered web page 107. In another implementation, the content item environments 114a, 114b, and 114c can be asynchronous environments, e.g., iFrames within the rendered web page 107.

Included in the body selection 110 are second instructions 116a, 116b and 116c, e.g., rendering instructions, that are associated with the content item environments 114a, 114b and 114c. The second instructions 116 are configured to invoke a request process that determines whether a content item request has been generated by an of the second instructions 116. In one implementation, in response to determining that a content item request has not been generated by any of the second instructions 116, the particular set of second instructions 116 being executed, e.g., second instructions 116a, generate a combined content item request 117 for content items for each of the content item environments 114a, 114b and 114c.

In one implementation, the first instructions 112a, 112b and 112c are interpreted before the second instructions 116a, 116b and 116c are processed by the client device 100. Accordingly, the content environments 114a, 114b and 114c are already defined when any of the second instructions 116a, 116b and 116c are executed. Thus, when the first set of second instructions 116 are executed, e.g., execution of the second instructions 116a, the process invoked by the second instructions 116a can determine that the content environments 114b and 114c are also defined, and thus generate the combined content item request 117.

In one implementation, the combined content item request 117 can include a concatenation of content item requests 118a, 118b and 118c that corresponds to requests for the content item environments 114a, 114b and 114c. In response, the content item server 120 can, for example, optimize the selection of corresponding content items 122a, 122b and 122c served. In one implementation, the content item server 120 includes optimization logic 121 to optimize the selection of the content items 122a, 122b and 122c. For example, the content items 122a, 122b and 122c can be selected according to the optimization logic 121 to ensure that disparate content items are selected, e.g., to ensure that none of the selected content items are duplicate content items.

In one implementation, the content item requests 118a, 118b and 118c can, for example, include an identical pageview identifier, and the optimization logic 121 can select content items 122a, 122b and 122c based on the pageview identifier and the address of the content item requests 118a, 118b and 118c. Other content item optimization selection processes can also be used.

The content items 122a, 122b and 122c can, for example, be transmitted to the client system 100 in a combined reply 123 and stored in a data store 130, e.g., a cache associated with a browser running on the client 100. In response to the combined request 117 issued by the second instructions 116a, the content item 122a is rendered in the content menu item environment 114a. Thereafter, upon execution of the second instructions 116b, the request process determines that a content item request has previously been generated, e.g., the combined content item request 117 and/or the content item requests 118a, 118b and 118c. In response to this determination, the second instructions 116b generate a local content item request 125 to the data store 130, which, in turn, provides the content item 122b to be rendered in the corresponding content item slot 114b. The second instructions 116c also generate a local content item request 129 to retrieve the content item 122c stored in the data store for rendering in the content item environment 114c.

Figure 2:
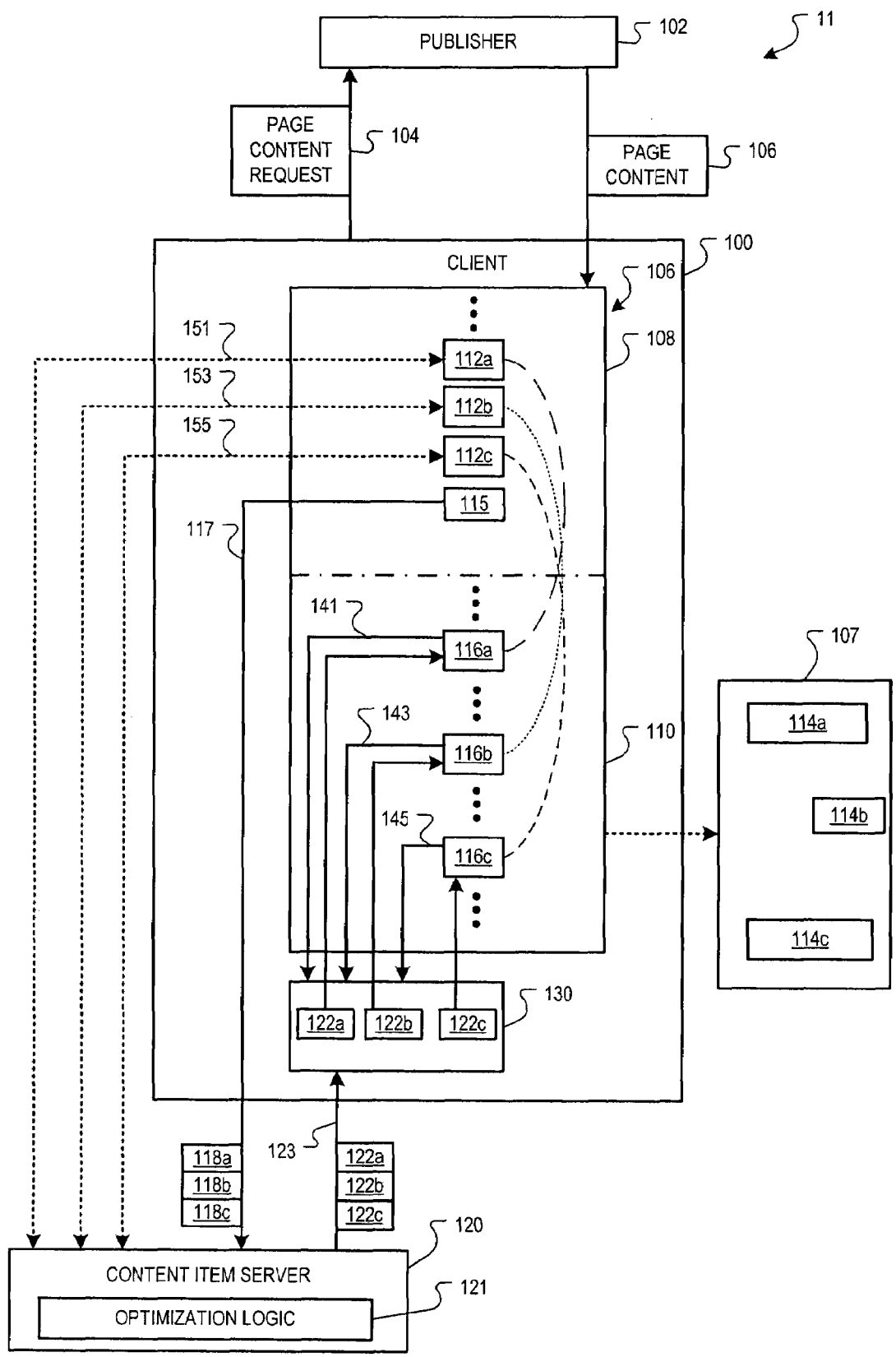
FIG. 2 is a block diagram of another example system for requesting content from a source.

FIG. 2 is a block diagram of another example system 11 for requesting content from a source. The system 11 of FIG. 2 operates in a similar manner to the system 10 of FIG. 1, except that separate content item request instruction 115 are executed to generate the combined content item request 117 that includes content request 118a, 118b and 118c for the content item environments 114a, 114b and 114c. The second instructions 116a, 116b and 116c are configured to generate local content item requests 141, 143 and 145, respectively, to retrieve and render the stored content items 122a, 122b and 122c in the content item environments 114a, 114b and 114c.

In another implementation, each of the first instructions 112a, 112b and 112c can retrieve content item environment characteristics, e.g., height and width dimensions. For example, the first instructions 112a, 112b and 112c can transmit content item environment requests 151, 153 and 155, respectively to the content item environments 114a, 114b and 114c. Often a publisher or a content item provider may modify a content item environment 114; accordingly, by storing the modify the web page content 106.

Figure 3:
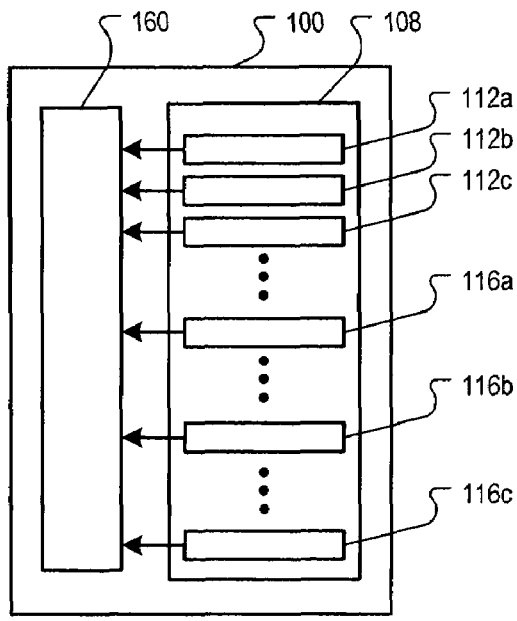
FIG. 3 is a block diagram of a source document and a corresponding cached instruction library.

FIG. 3 is a block diagram of an example source document 106 and a corresponding cached instruction library 160. The cached instruction library 160 can, for example, include one or more function, such as javascript functions, that are invoked by the first instructions 112 and the second instructions 116. In one implementation, the instructions library 160 can be provided by the content item server 120 and stored in a local data store on the client system 100. For example, upon rendering the web page content 106 and encountering first instruction 112, the client system 100 can determine if the instruction library 160 is stored in a local data store, e.g., a cache associated with a browser application. If the instruction library 160 is not stored in the local data store, the client system 100 can request the instruction library 160 from the content item server 120.

By implementing function calls in the first instruction 112 and the second instructions 116 to the instruction library 160, the provider of the content server 120 may implement query changes and other content request changes that are essentially transparent to providers of the publisher systems 102.

Figure 4:
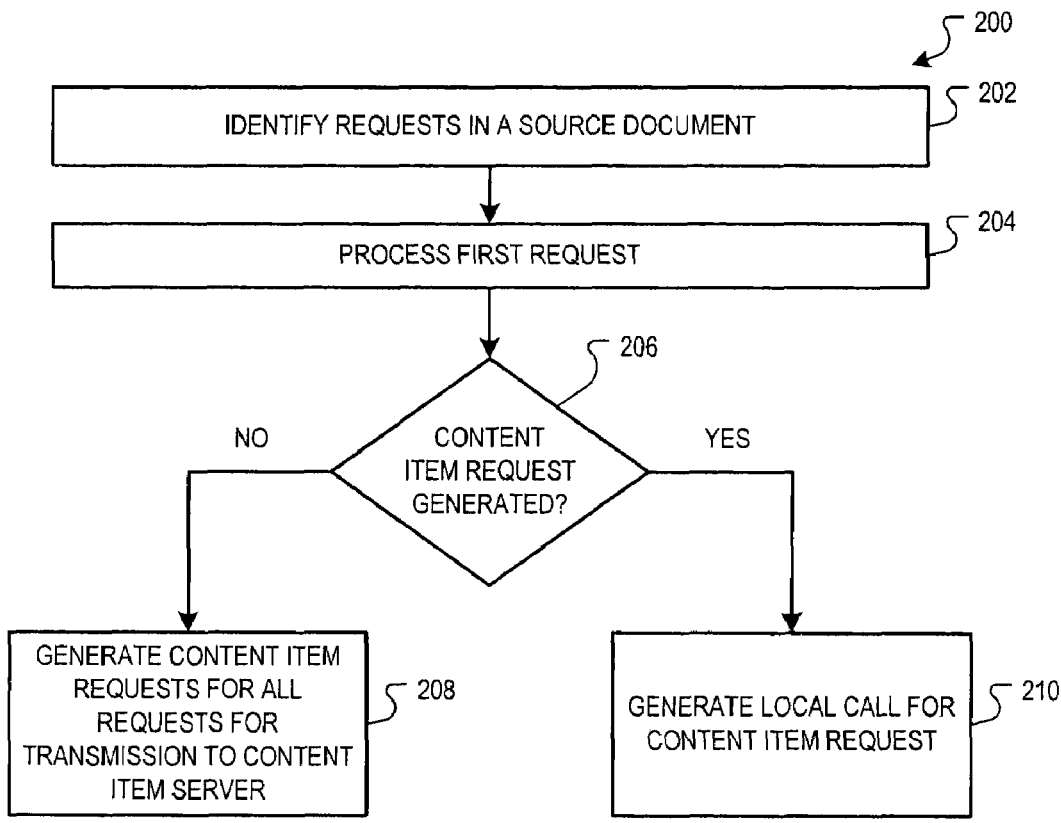
FIG. 4 is a flow diagram of an example process for handling content item requests.

FIG. 4 is a flow diagram of an example process 200 for handling content item requests. The example process 200 can, for example, be implemented in the client system 100 by rendering the web page content 106 and executing the instructions 112 and 116.

Stage 202 identifies requests in a source document. For example, a client system 100, such as a web browser, can execute the instructions 112 to identify requests in a source document, such as web page content 106.

Stage 204 processes the first request. For example, a client system 100, such as a web browser, can execute the instructions 116a related to a content item request for the content item environment 114a.

Stage 206 determines if a content item request to a content item server has been generated. For example, a client system 100, such as a web browser, can execute the instructions 116a to determine if a combined content item request 117 or content item requests 118a, 118b and/or 118c have been generated and/or transmitted to the content item server.

If stage 206 determines that a content item request to a content item server has not been generated, then stage 208 generates content item request for all requests in the web page for transmission to the content item server. For example, a client system 100, such as a web browser, can execute the instructions 116a to generate the combined request 117.

If, however, stage 206 determines that content item request to a content item server has been generated, then stage 210 generates local content item request. For example, a client system 100, such as a web browser, can execute the instructions 116b and 116c to generate the local content item requests 125 and 129, respectively.

Figure 5:
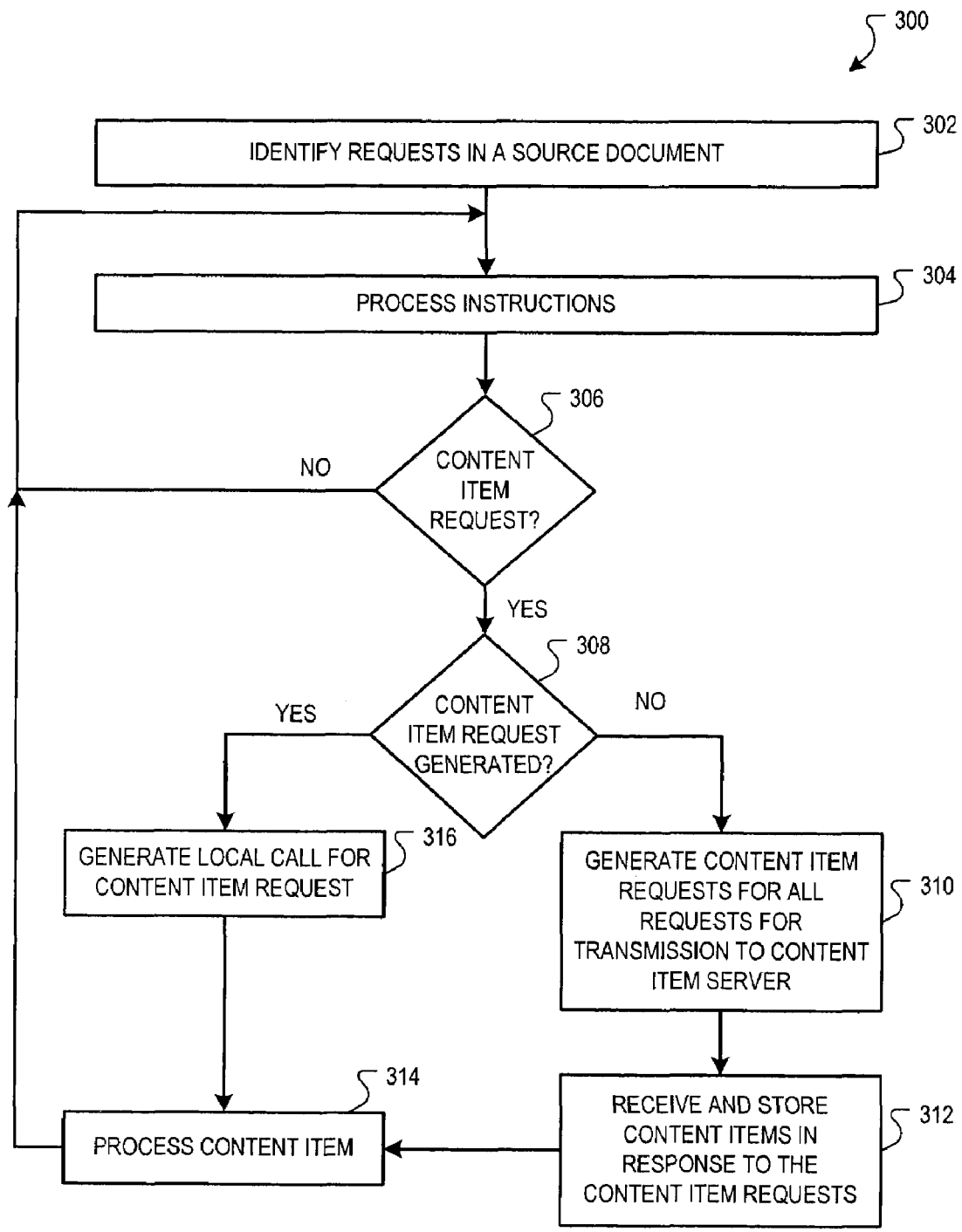
FIG. 5 is a flow diagram of another example process for handling content item requests.

FIG. 5 is a flow diagram of another example process 300 for handling content item requests. The example process 300 can, for example, be implemented in the client system 100 by rendering the web page content 106 and executing the instructions 112 and 116.

Stage 302 identifies requests in a source document. For example, a client system 100, such as a web browser, can execute the instructions 112 to identify requests in a source document, such as web page content 106.

Stage 304 processes instructions in the source document. For example, a client system 100, such as a web browser, can execute other instruction in the web page source document 106, such as formatting instructions, imaging instructions, javascripts, etc.

Stage 306 determines if the instructions are a content item request. For example, a client system 100, such as a web browser, upon executing the instructions 116a can determine that the instructions are content item request processing instructions.

If stage 306 determines that the instructions are not a content item request, then the process returns to stage 304. If, however, stage 306 determines that the instructions are a request instruction, then stage 308 determines if a content item request to a content item server has been generated. For example, a client system 100, such as a web browser, can execute the instructions 116a to determine if a combined content item request 117 or content item requests 118a, 118b and/or 118c have been generated and/or transmitted to the content item server.

If stage 308 determines that a content item request to a content item server has not been generated, e.g., the content item request is the first content item request to be processed, then stage 310 generates content item requests for all requests in the web page for transmission to the content item server. For example, a client system 100, such as a web browser, can execute the instructions 116a to generate a combined content item request 117.

After stage 310 processes, stage 312 receives and stores the content items that are provided in response to the content item requests, and stage 314 processes the content item for the first content item request. For example, a client system 100, such as a web browser, can receive and store in a data store, such as the data store 130, the content items 122a, 122b and 122c provided by the content item server 120. Thereafter, the content item 122a can be rendered in the content item environment 114a.

If however stage 308 determines that a content item request to a content item server has been generated e.g., the content item request is a second or subsequent content item request to be processed, then stage 316 generates a local content item request, and stage 314 processes the content item for the subsequent content item request.

Figure 6:
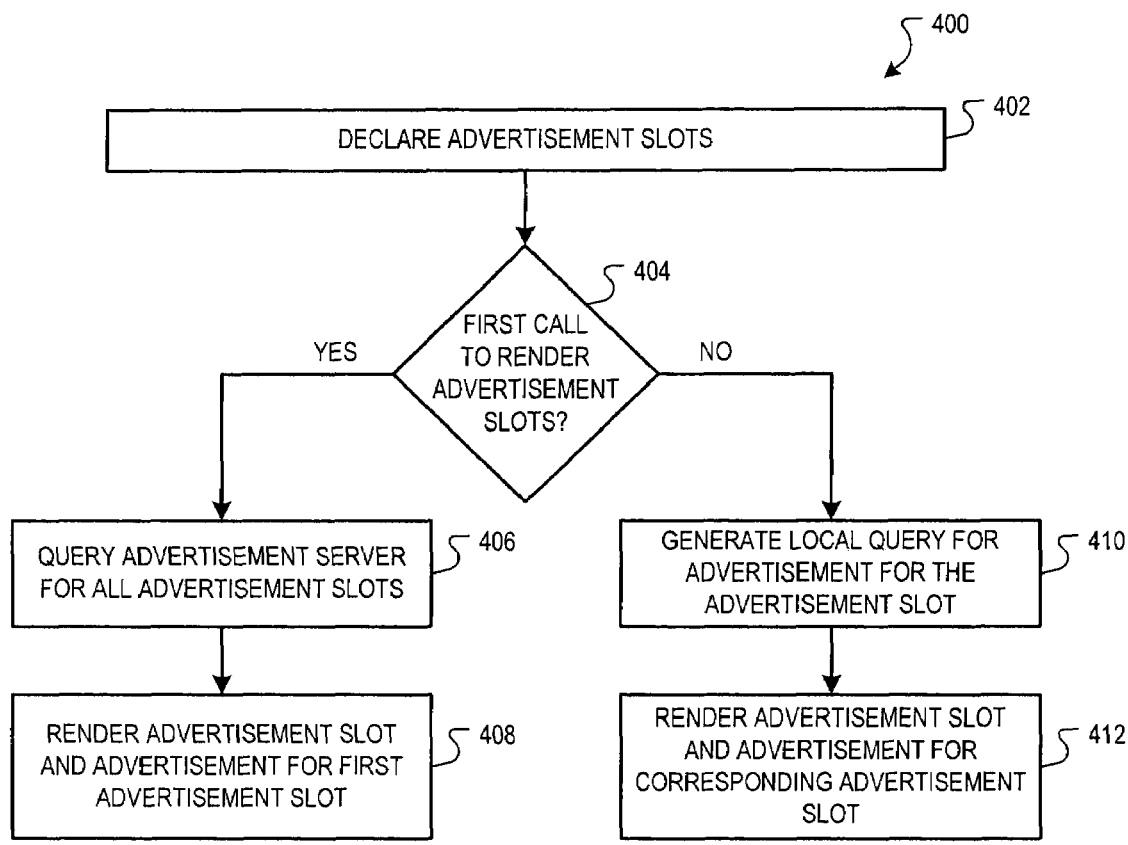
FIG. 6 is a flow diagram of another example process for handling content item requests.

FIG. 6 is a flow diagram of another example process 400 for handling content item requests. The example process 400 can, for example, be implemented in the client system 100 by rendering the web page content 106 and executing the instructions 112 and 116.

Stage 402 declares advertisement slots. For example, a client system 100, such as a web browser, can execute the instructions 112 to declare advertisement slots in a web page.

If Stage 404 determines if a call to render an advertisement slot is a first call. For example, a client system 100, such as a web browser, can execute the instructions 116a to determine if a advertisement requests have been generated and/or transmitted to the an advertisement server.

If stage 404 determines that the call to render the advertisement slot is a first call, then stage 406 queries an advertisement server for all advertisement slots. For example, a client system 100, such as a web browser can execute the instructions 116a to generate a combined advertisement request that includes advertisement requests for all advertisement slots in the web page. In one implementation the combined request can include queries to fetch advertisements for all of the advertisement slots declared in stage 402. After stage 406 process, stage 408 renders an advertisement slot and an advertisement for the first advertisement slot. For example, a client system 100, such as a web browser, can execute the instructions 116a to render an advertisement slot and an advertisement received from an advertisement server.

If, however, stage 404 determines that the call to render the advertisement slot is not a first call, then stage 410 generates a local query for the advertisement for the advertisement slot. For example, a client system 100, such as a web browser, can execute the instructions 116b and 116c to generate local queries to a local data store, such as a cache associated with the web browser.

Stage 412 renders the advertisement slot and the advertisement for the corresponding advertisement slot. For example, a client system 100, such as a web browser, can execute the instructions 116b and 116c to render corresponding advertisement slots and advertisement received from an advertisement server and stored in the local data store.

Figure 7:
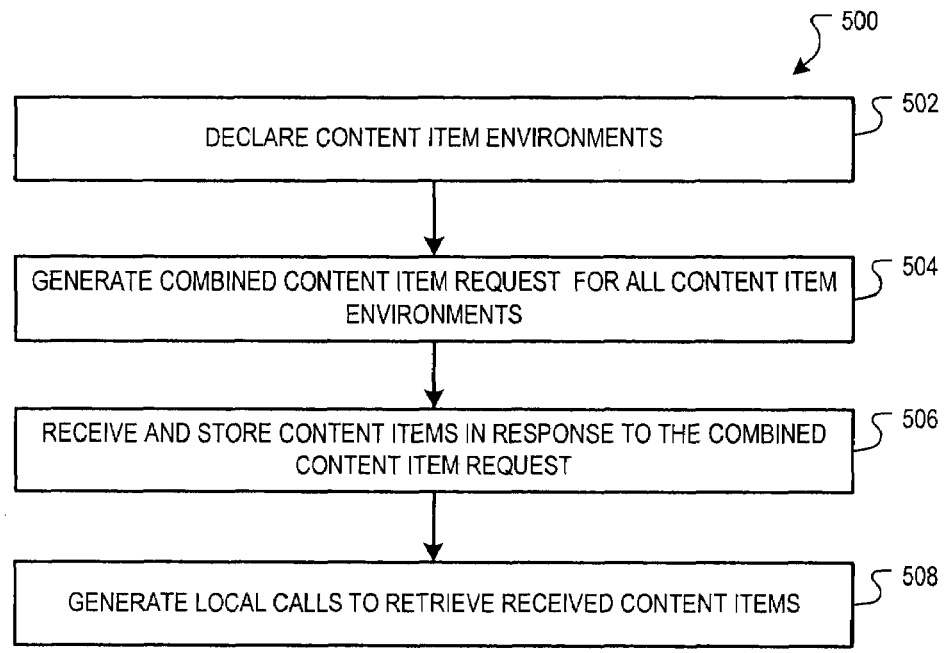
FIG. 7 is a flow diagram of another example process for handling content item requests.

FIG. 7 is a flow diagram of another example process 500 for handling content item requests. The example process 500 can, for example, be implemented in a client system 100 by rendering the web page content 106 and executing the instructions 112, 115 and 116.

Stage 502 declares content item environments. For example, a client system 100, such as a web browser, can execute the instructions 112a, 112b and 112c to declare the content item environments 114a, 114b and 114c.

Stage 504 generates a combined content item request for all content item environments. For example, a client system 100, such as a web browser, can execute the instructions 115 to generate a combined content item request 117.

Stage 506 receives and stores content items in response to the combined content item request. For example, a client system 100, such as a web browser, can receive and store the content items 112a, 112b and 112c in the data store 130, e.g., a cache associated with the web browser.

Stage 508 generates local calls to retrieve content items. For example, a client system 100, such as a web browser, can execute the instructions 116a, 116b, and 116c to generate local calls 141, 143 and 145 to the data store 130 to retrieve the content items 122a, 122b and 122c, respectively.

Figure 8:
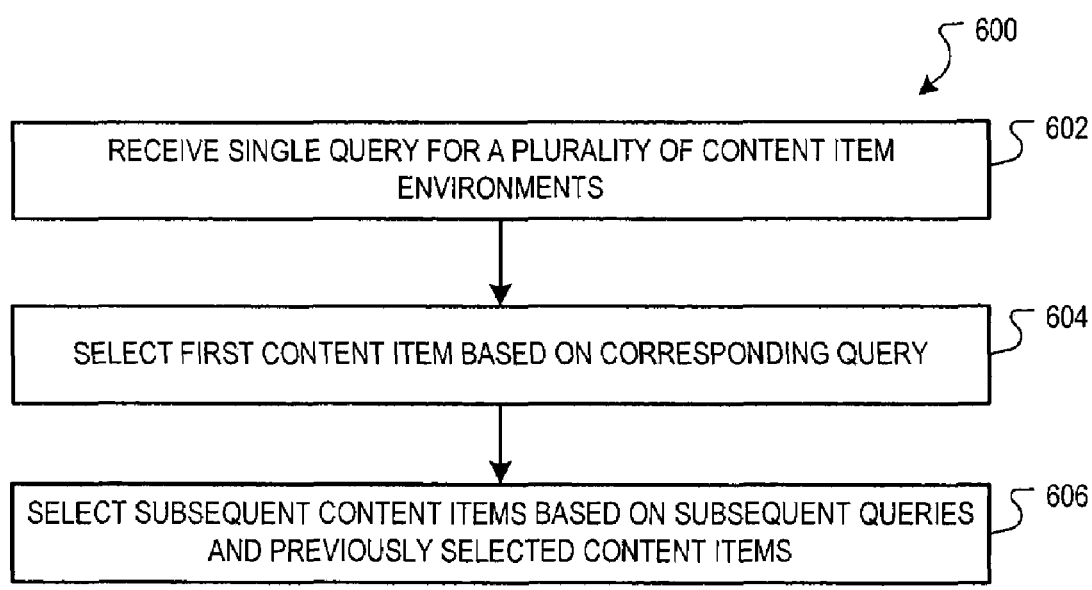
FIG. 8 is a flow diagram of an example process for responding to an consolidated content item request.

FIG. 8 is a flow diagram of an example process 600 for responding to a consolidated content item request. The example process 600 can, for example, be implemented in a content item server, such as the content item server 120, that include optimization logic, such as optimization logic 121.

Stage 602 receives a single query for a plurality of content item environments. For example, a combined content item request 117 can be received by the content item server 120. The combined content item request 117 can include multiple content item requests, e.g., 118a, 118b, and 118c. In one implementation, each content item request 118 includes a common identifier, e.g., the same pageview identifier.

Stage 604 selects a first content item based on a corresponding content item query. For example, the content item server 120 can select the content item 122a based on the content item request 118a.

Stage 606 selects subsequent content items based on subsequent queries and previously selected content items. For example, the content item server 120 can select the content items 122b and 122c based on the content item request 118b and 118c, and also based on the previously selected content item 122a. The selection process may be implemented in the optimization logic 121.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
    identifying, at a client computer, requests in a web page source document, the web page source document defining content item environments in a web page, and associating each content item environment with a corresponding request in the web page source document;
    for each request:
        determining, at the client computer, if any of the requests have generated a content item request; and
        in response to determining that a content item request has not been generated by any of the requests:
            generating, at the client device, a combined content item request for an optimized selection of content items for all requests in the web page source document, the optimized selection of content items including a corresponding content item responsive to each request;
            receiving, at the client device, the optimized selection of content items in response to the combined content item request; and
            storing in a data store, at the client device, the optimized selection of content items received;
        in response to determining that a content item request has been generated by any of the requests;
            generating, at the client device, a local content item call to the data store for the content item corresponding to the request;
            retrieving the content item from the optimized selection of content items stored in the data store in response to the local content item call; and
            rendering the content item in a content item environment;
    wherein the content items are advertisements, and the optimized selection of content items are disparate advertisements.

2. The method of claim 1, wherein:
    the content item environments comprise iframes; and
    the content items comprise advertisements.

3. The method of claim 1, wherein the web page source document defines content environments in a head section of the web page source document.

4. The method of claim 1, wherein:
    determining if any of the requests have generated a content item request comprises:
        determining if content item request has been transmitted to a content item server.

5. The method of claim 1, wherein generating a combined content item request comprises:
    generating, at the client device, a plurality of content item requests, each of content item requests being a corresponding request for each second instruction;
    assigning, at the client device, an identical pageview identifier to each content item request; and
    combining, at the client device, the plurality of content item requests into the combined content item request.

6. A system, comprising:
    a data store storing instructions executable by a client device, the instructions stored in a source document defining a web page and including:
        first instructions configured to cause the client device to render content item environments in a page environment of a web page rendered from the source document; and
        corresponding second instructions associated with each content item environment and configured to cause the client device to determine, for each second instructions associated with each content item environment:
            if any of the second instructions have caused the client device to have generated a combined content item request; and
            in response to determining that the client device has not generated a content item request from any of the second instructions:
                generate, at the client device, a combined content item request for an optimized selection of content items for all second instructions in the web page source document, the optimized selection of content items including a corresponding content item for each second instruction;
                receive, at the client device, the optimized selection of content items in response to the combined content item request; and
                store in a data store, at the client device, the optimized selection of content items received;
            in response to determining that the client device has generated a content item request from any of the second instructions;
                generate, at the client device, a local content item call to the data store for the content item corresponding to the second instruction;
                retrieve the content item from the optimized selection of content items stored in the data store in response to the local content item call; and
                render the content item in the content item environment;
    wherein the content items are advertisements, and the optimized selection of content items are disparate advertisements.

7. The system of claim 6, wherein:
the first and second instructions comprise interpreted instructions.

8. The system of claim 6, wherein:
the first and second instructions comprise scripts.

9. The system of claim 6, wherein:
the source document comprises a hypertext markup language document.

10. The system of claim 9, wherein:
the first instructions are located in a head section of the source document; and
the second instructions are located in a body section of the source document.

11. The system of claim 6, wherein:
the content item environments comprise divs.

12. The system of claim 6, wherein:
the first instructions and the second instructions are stored in the source document so that the first instructions are executed before the second instructions.

13. The system of claim 6, wherein generating a combined content item request comprises:
generating, at the client device, a plurality of content item requests, each of content item requests being a corresponding request for each second instruction;
assigning, at the client device, an identical pageview identifier to each content item request; and
combining, at the client device, the plurality of content item requests into the combined content item request.

14. A system, comprising:
a data store storing a web page source file, the web page source file including:
declaration instructions configured to cause a client device to define advertisement slots in a web page; and
corresponding rendering instructions associated with each of the advertisement slots and configured to cause the client device to determine, for each rendering instruction:
if any of the rendering instructions have caused the client device to have generated a combined advertisement request;
in response to determining that the client device has not generated a combined advertisement request for any of the rendering instructions:
generate, at the client device, a combined advertisement request for an optimized selection of advertisement for all rendering instructions in the web page source document, the optimized selection of advertisements being disparate advertisements that include a corresponding advertisement for each rendering instruction;
receive, at the client device, the optimized selection of advertisements in response to the combined content item request; and
store in a data store, at the client device, the optimized selection of advertisements received;
in response to determining that the client device has generated an advertisement request from any of the rendering instructions:
generate, at the client device, a local advertisement request to the data store for the advertisement corresponding to the rendering instruction;
retrieve the advertisement from the optimized selection of advertisements stored in the data store in response to the local advertisement request; and
render the advertisement in the advertisement slot.

15. The system of claim 14, wherein:
the declaration instructions comprise declaration snippets corresponding to each advertisement slot; and
the rendering instructions comprise rendering snippets corresponding to each advertisement slot.

16. The system of claim 15, wherein:
the declaration snippets and the rendering snippets are javascript compatible.

17. The system of claim 15, wherein:
the declaration snippets are stored in a head section of the web page source file.

18. The system of claim 14, wherein generating a combined advertisement request comprises:
generating, at the client device, a plurality of advertisement requests, each of advertisement requests being a corresponding request for each rendering instruction in the web page source document;
assigning, at the client device, an identical pageview identifier to each advertisement request; and
combining, at the client device, the plurality of content item requests into the combined content item request.

* * * * *

UNITED STATES PATENT AND TRADEMARK OFFICE
CERTIFICATE OF CORRECTION

PATENT NO. : 7,657,611 B2
APPLICATION NO. : 11/554348
DATED : February 2, 2010
INVENTOR(S) : Stephen Tsun and Deepak Jindal It is certified that error appears in the above-identified patent and that said Letters Patent is hereby corrected as shown below:

In Claim 1, Column 7, Line 59, please delete "requests;" and insert -- requests: --.

In Claim 6, Column 8, Line 56, please delete "instructions;" and insert -- instructions: --.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO.      : 7,657,611 B2                                    Page 1 of 1
APPLICATION NO. : 11/554348
DATED           : February 2, 2010
INVENTOR(S)     : Tsun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Twenty-eighth Day of December, 2010

David J. Kappos
*Director of the United States Patent and Trademark Office*